United States Patent [19]
Saxena

[11] Patent Number: 5,699,543
[45] Date of Patent: Dec. 16, 1997

[54] PROFILE GUIDED TLB AND CACHE OPTIMIZATION

[75] Inventor: Sunil Saxena, Sunnyvale, Calif.

[73] Assignee: Intel Corporation, Santa Clara, Calif.

[21] Appl. No.: 536,951

[22] Filed: Sep. 29, 1995

[51] Int. Cl.⁶ .................. G06F 9/30; G06F 9/26; G06F 12/10
[52] U.S. Cl. .......... 395/413; 395/412; 395/416; 395/417; 395/403; 395/445
[58] Field of Search .................. 395/413, 412, 395/416, 417, 445, 403

[56] References Cited

U.S. PATENT DOCUMENTS

| | | | |
|---|---|---|---|
| 4,638,426 | 1/1987 | Chang et al. | 395/421.06 |
| 4,669,043 | 5/1987 | Kaplinsky | 395/403 |
| 4,730,249 | 3/1988 | O'Quin, II et al. | 395/700 |
| 4,881,075 | 11/1989 | Weng | 341/87 |
| 5,060,137 | 10/1991 | Bryg et al. | 395/250 |
| 5,282,274 | 1/1994 | Liu | 395/416 |
| 5,394,537 | 2/1995 | Courts et al. | 395/412 |
| 5,423,014 | 6/1995 | Hinton et al. | 395/403 |
| 5,493,660 | 2/1996 | DeLano et al. | 395/416 |

*Primary Examiner*—David K. Moore
*Assistant Examiner*—Than V. Nguyen
*Attorney, Agent, or Firm*—Blakely, Sokoloff, Taylor & Zafman

[57] ABSTRACT

A method and an apparatus for profile guided TLB's (translation look-aside buffer) and cache optimization in an operating system. A typical operating system has a working set of information for any application which is running at some time. This working set of information can be written out by the operating system in some section of the object file. Once this information is in the object file, it may be utilized by the operating system in various ways. The method and apparatus decreases TLB misses for the benchmarks, disables infrequently used pages from disturbing the caches, and provides better rates on caches. This and many other advantages of the invention allow an increased efficiency and optimization of a given operating system.

21 Claims, 6 Drawing Sheets

PROFILE GUIDED TLB AND CACHE OPTIMIZATION

BACKGROUND OF THE INVENTION

(1) Field of the Invention

The present invention is related to the field of memory access during application execution. More specifically, the method and apparatus of the present invention is related to profile guided TLB (translation look-aside buffer) and cache optimization in an operating system.

(2) Prior Art

Existing operating systems do not take into account any information regarding the behavior of a given application. More specifically, as an application is running, the operating system does not save or store the history of the application as they are being generated, and therefore can not take advantage of the information at a later time when the application is being executed once again.

There are many different types of information on a given application that are useful to an operating system which must repeatedly run the application. One such example is the branching information of a given application. In order to run branch instructions, the branch penalty in terms of time must be paid. Branch instructions take up more CPU time than sequential instructions in an application being run. If the destination and the resources required of branch instructions are known by the operating system before an application is run, then the branch penalty associated with a branch instruction may be minimized. There are many other types of information which would be helpful if available to the operating system in improving overall system efficiency. For example, it would be helpful to have available information which helps to decrease the number of translation entries necessary during program execution. Additionally, it would be helpful to have information which helps reduce the number of TLB-miss and page faults processing by the CPU. A TLB refers to hardware cache that contains virtual-to-real address translations. Such reduction of the number of TLB-miss and page faults processing by the CPU can greatly improve overall system efficiency.

More specifically, each translation entry in the TLB typically deals with one fixed page size. A page size is a unit of address space that a translation entry defines a mapping from a virtual address to a physical address. For example, given that a pages size is 4K bytes, a translation entry defines the mapping between 4K bytes of virtual address to 4K bytes of physical address. If an application requires 13K bytes, the operating system uses four pages of memory or 16K bytes to accommodate the needs of the application. The 4K page size would require 4 translation entries for program execution. If the execution profile of the application shows that it only needs two pages of memory resident for most of its execution, the operating system could use this information and optimize memory allocation for the program. It could also optimize the TLB usage of the program, by preloading the 2 translation entries to avoid TLB lookup when the translation entries are not in the cache.

It is therefore desirable to have a method and an apparatus which provides for information useful to the operating system which is generated by an application while it is executing and which may be saved and made available for later use by the operating system for program re-execution.

BRIEF SUMMARY OF THE INVENTION

A method and an apparatus for profile guided TLB and cache optimization in an operating system are disclosed. A typical operating system has a working set of information for any application which is running at some time. In a presently preferred embodiment of the present invention, this working set of information can be written out by the operating system in some section of the object file. Once this information is in the object file, it may be utilized by the operating system in various ways.

The information may be stored in the form of one bit or many bytes per page. In addition, when there are many bytes per page, the information may provide per page usage. An embodiment of the present invention allows for a bitmap for a set of pages. Such information provides among other things, the set of pages that constitute the working set of the application. Having the working set information allows an operating system to allocate large page sizes (for example, 8k, 16k, 32k and 64k) that are becoming available on a new generation of processors. The ability to allocate a large piece size reduces the number of TLB entries required for an application while it's running and provides lower TLB miss rates. Furthermore, this information may be utilized to preload TLBs as newer generations of processors provide instructions to load TLBs.

The most important usage of this bitmap information is to allow effective usage of TLB and TLB's with a large page size. The amount of memory utilized by an application using a multiple enlarged page size would be the same as used by applications using only 4K page size.

With the present invention, a more detailed information may be made available on a per page basis. This is advantageous for applications running for a reasonable length of time, since detailed information requires more space in the object file. Such detailed information may provide true page usage of an application. Operating systems may therefore avoid much of the TLB misses for benchmarks including SPEC and TPC. Further, the operating system may also disable pages from disturbing the caches when the pages are not frequently used and therefore provide better hit rates on caches for the remaining pages. In most processors available today, the caches may be disabled on a per page basis. With the present invention, the caches may be disabled for infrequently used pages. Additionally, the present invention may enable the warming up of caches for frequently used pages.

The method and apparatus of the present invention decreases TLB misses for the benchmarks, disables infrequently used pages from disturbing the caches, and provides better hit rates on caches. This and many other advantages of the invention allow an increased efficiency and optimization on execution of applications by a given operating system.

DETAILED DESCRIPTION OF THE INVENTION

An apparatus and a method for a profile guided TLB (translation look-aside buffer) and cache optimization in an operating system are disclosed.

Figure 1:
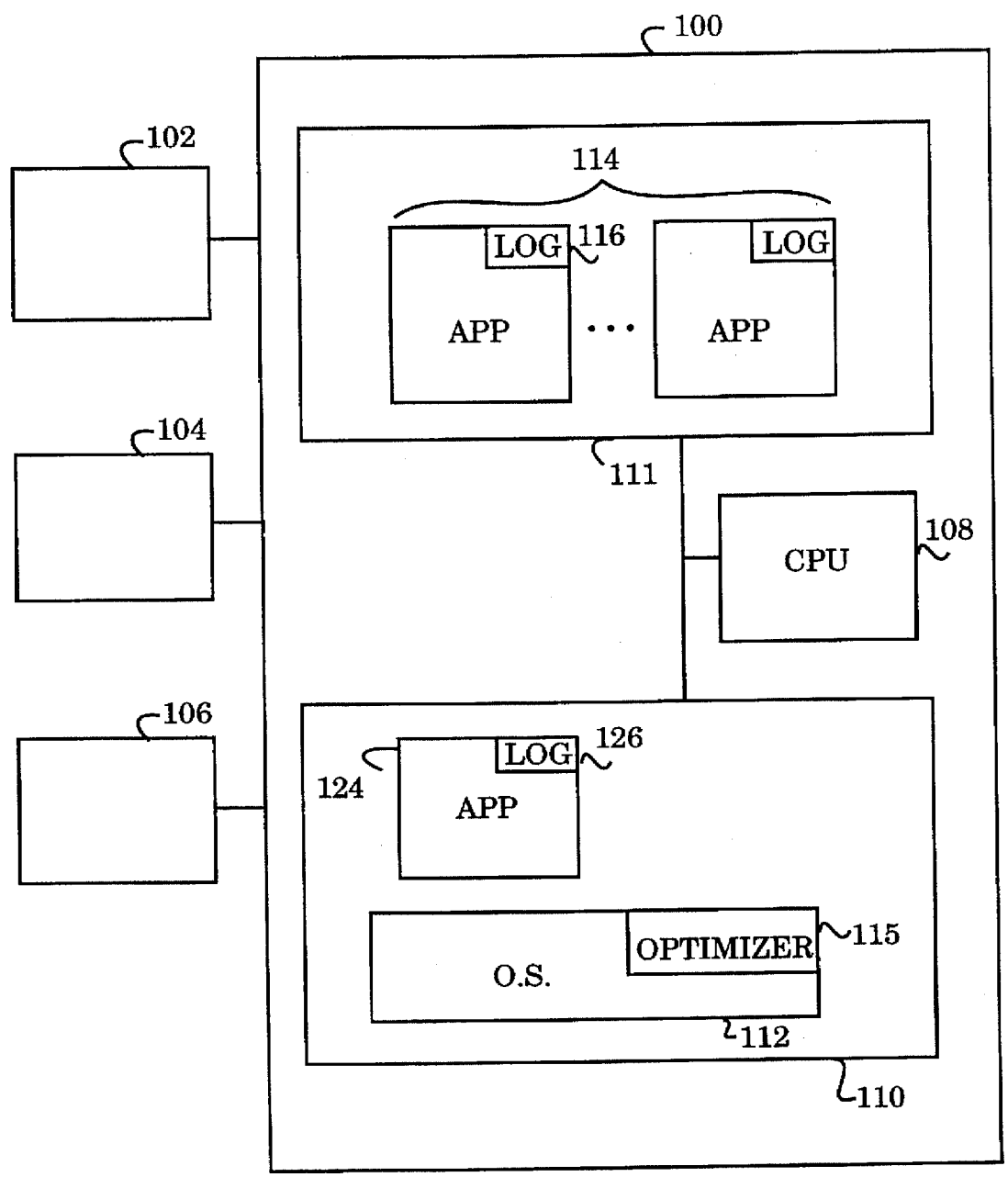
FIG. 1 illustrates an exemplary computer system with an exemplary implementation of the present invention.

FIG. 1 illustrates an exemplary computer system 100 with an exemplary implementation of the present invention. Several peripheral devices may be coupled to computer system 100, including monitor 102, modem 104 and keyboard 106. Computer 100 also has CPU 108 coupled to memory 110 and disk 111. Memory 110 has operating system 112 with the present invention's optimizer 115 for optimizing profile guided TLBs and cache access. Disk 111 has one or more applications 114 with log portion 116 where information regarding applications 114 are stored. Once log 116 is produced for a given application 114, it is written into application 114 in disk 111. A copy application 124 and its log 126 of application 114 and its log 116 is brought into memory 110 when operating system 112 is ready to execute the application.

Figure 2:
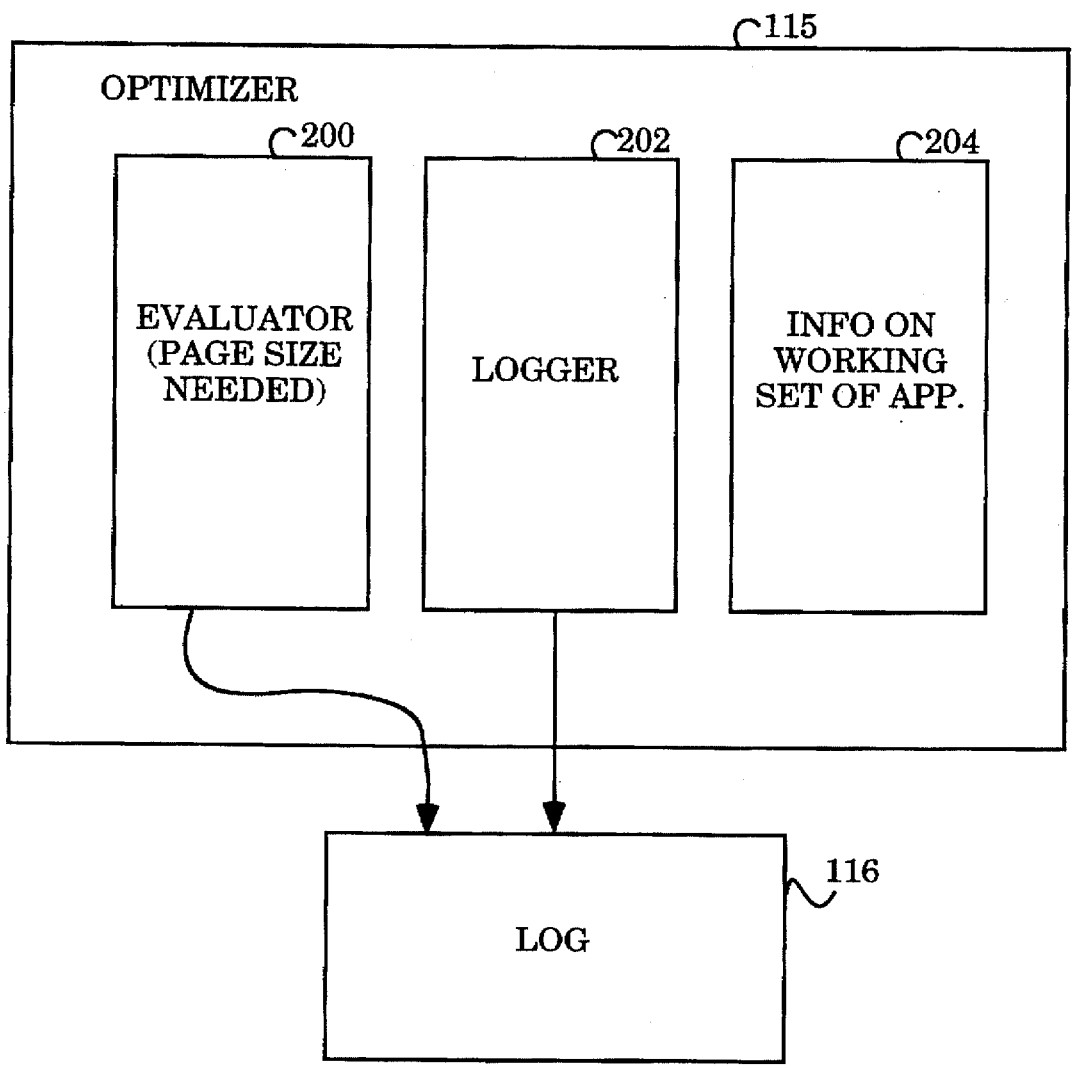
FIG. 2 illustrates a more detailed description of the optimizer illustrated in FIG. 1.

FIG. 2 illustrates a more detailed description of the optimizer illustrated in FIG. 1. Optimizer 115 has evaluator 200, logger 202 and working set information 204. When application 114 is initially executed, evaluator 200 determines the working set 204 of the application 114. Logger 202 then logs the working set of that particular application 114 into log 116 of application 114.

Figure 3:
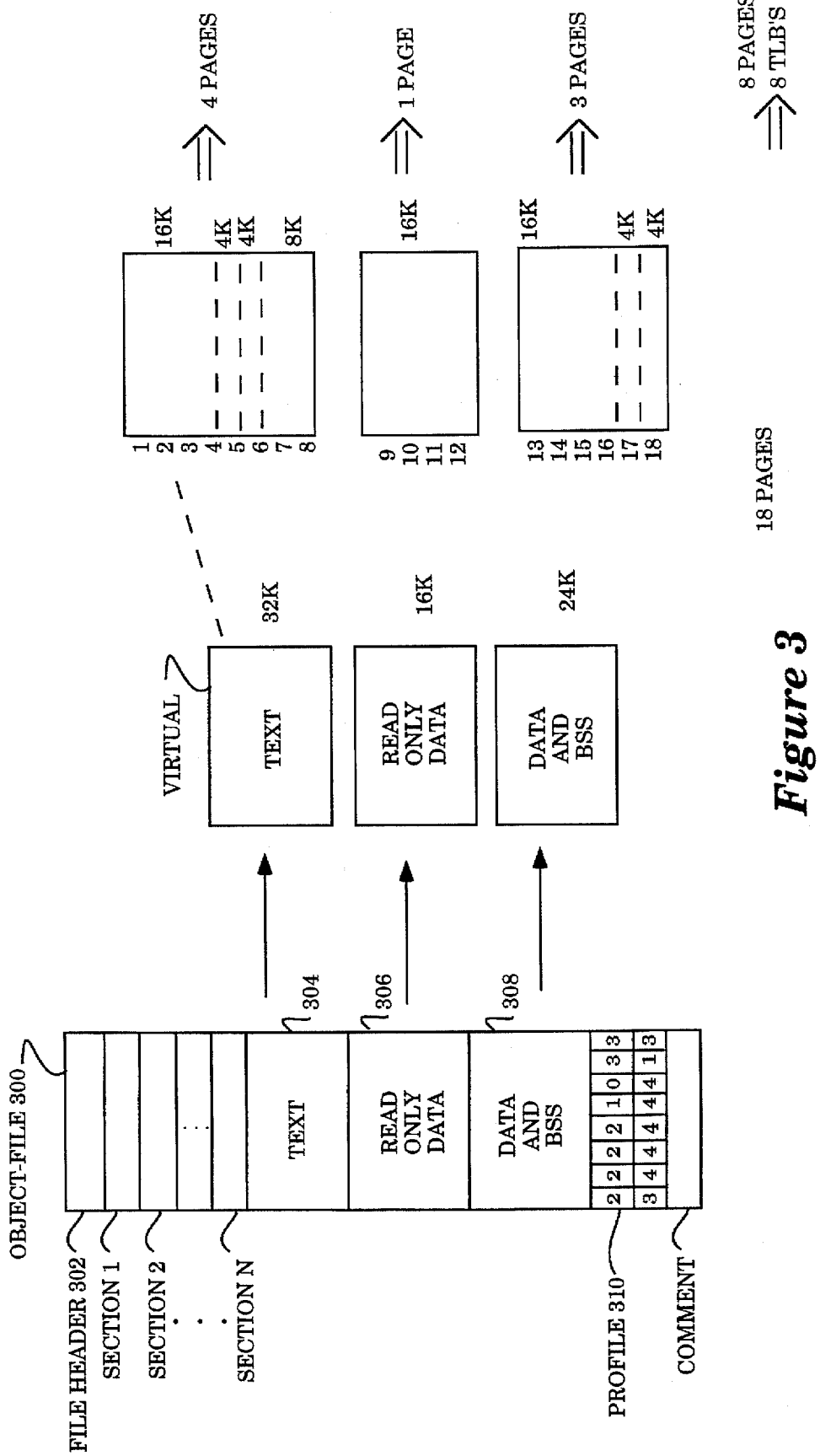
FIG. 3 is an exemplary implementation of the present invention.

FIG. 3 illustrates an exemplary process followed by an exemplary embodiment of the present invention. Application 114 is object file 300. Object file 300 has a file header 302, a text section 304 which is mainly composed of a sequence of instructions, a read only data section 306 and a data section 308. When application 114 is brought into memory for execution by operating system 112, text section 304 is read from disk and loaded into memory along with read only section 306 and data section 308 from object file 300. Sections 304, 306 and 308 are exemplary sections brought into memory. Operating system 112 then begins executing the instructions in text section 304.

File header 302 indicates various information including where the text section is, how many sections there are and what operating system 112 needs to load in order to execute application 114. Given that in this implementation, text section 304 is 32K, read only section 306 is 16K and data section 308 is 24K, eighteen pages of physical memory are necessary with a conventional operating system, where each page or piece size is defined to be 4K. Furthermore, 18 TLB entries are necessary.

Logger 200 logs into the object file a number that reflects relative usage of a single page during the execution of a given application under profile 310. For example, the first four pages in physical memory are used more often than the fifth or sixth page. Thus, the first four pages which are used often may be mapped into a page with a piece size of 16K covering all four pages. The fifth or sixth page which are not used very often may be assigned two pages with a piece size of 4K each.

Similarly, pages seven and eight are mapped into a page with a piece size of 8k; pages nine through twelve are mapped into a page with a piece size of 16k; pages thirteen through sixteen are mapped into a page with a piece size of 16k. The above mapping scheme needs only 8 translation entries as compared to 18 entries for the conventional operating system. In addition, it provides an opportunity for an operating system to preload the TLB entry for frequently used pages and avoid TLB-miss processing on those frequently used pages. Further, the above described mapping scheme allows an operating system to load the frequently used pages from disk to altogether avoid page fault processing for those pages. Whenever the application is executed, the present invention reduces the time required to handle TLB-miss processing by the CPU. The storage organization of the present invention effectively optimizes the TLB usage.

Figure 4:
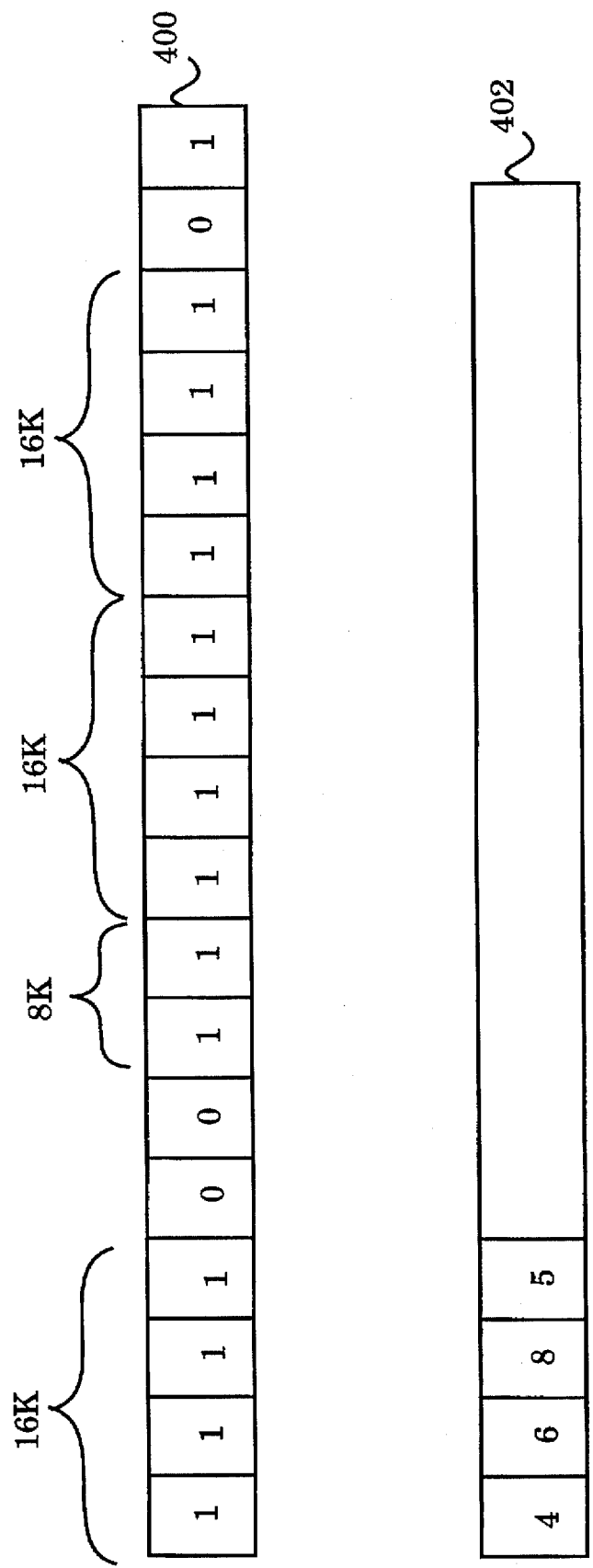
FIG. 4 illustrates two exemplary implementations of profile from FIG. 3.

FIG. 4 illustrates two exemplary implementations of profile 310 from FIG. 3. Profile 310 may be implemented by having a one-bit data reflecting whether or not the given page is used often. For example, exemplary profile 400's first entry has a one indicating that the corresponding page one is used often, whereas the fifth entry in the exemplary profile 400 has a zero indicating that the fifth entry in the physical memory corresponding to this entry in the profile is not used as often as the other entries in the profile.

If more bits are allocated per profile entry, then more information regarding the usage of each page may be provided. For example, with exemplary profile 402, each entry may have four bits allowing for an entry to indicate how many times the corresponding physical memory page is used in a single execution of an application, assuming that the maximum time such pages are utilized is under eight. The embodiment of the implementation of the present invention illustrated herein is for exemplary purposes only, and other implementations may occur to a person skilled in the art given the detailed description of the present invention herein.

Figure 5:
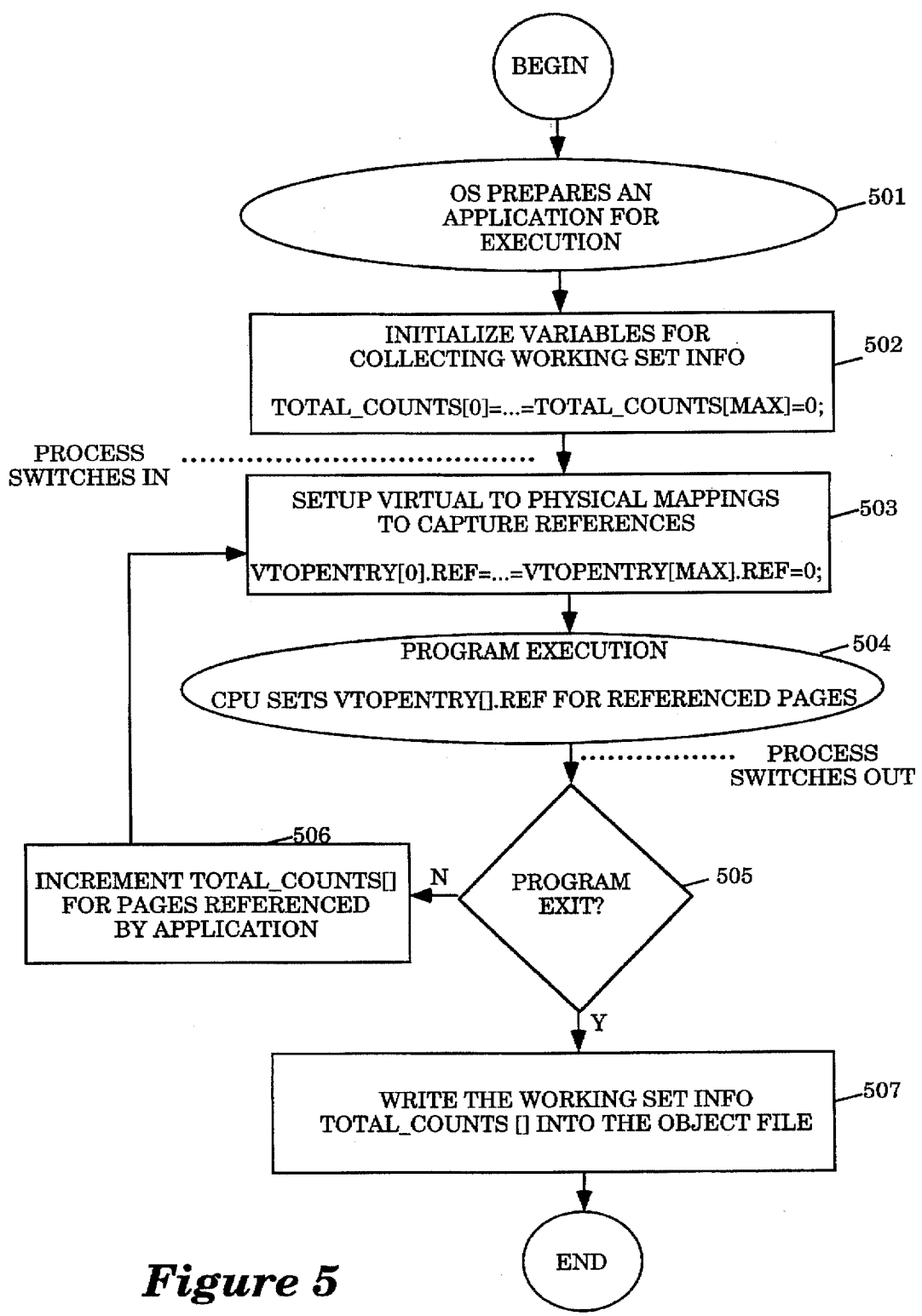
FIG. 5 illustrates the general steps followed by an exemplary implementation of the present invention in generating a working set information for an application.

FIG. 5 illustrates the general steps followed by the present invention in generating a working set information for an application. In step 501, the operating system prepares an application for execution. In step 502, variables used in collecting the working set information are initialized. The process then switches in, i.e. an application is about to be executed. In step 503, the virtual to physical mappings are set up to capture references to pages by the application. In step 504, the application (program) executes, during which the CPU sets the virtual to physical mapping references for referenced pages. When the process switches out, it's determined whether its from a program exit in step 505. If it is not a program exit, i.e. the application will continue to execute, then in step 506, total number of times pages are referenced by the application is updated and the process described between steps 503 and 505 are repeated. When the process switches out signifying a program exit in step 505, then step 507, the working set information with the total counts of the number of times pages are referenced by the application is written into the object file.

Figure 6:
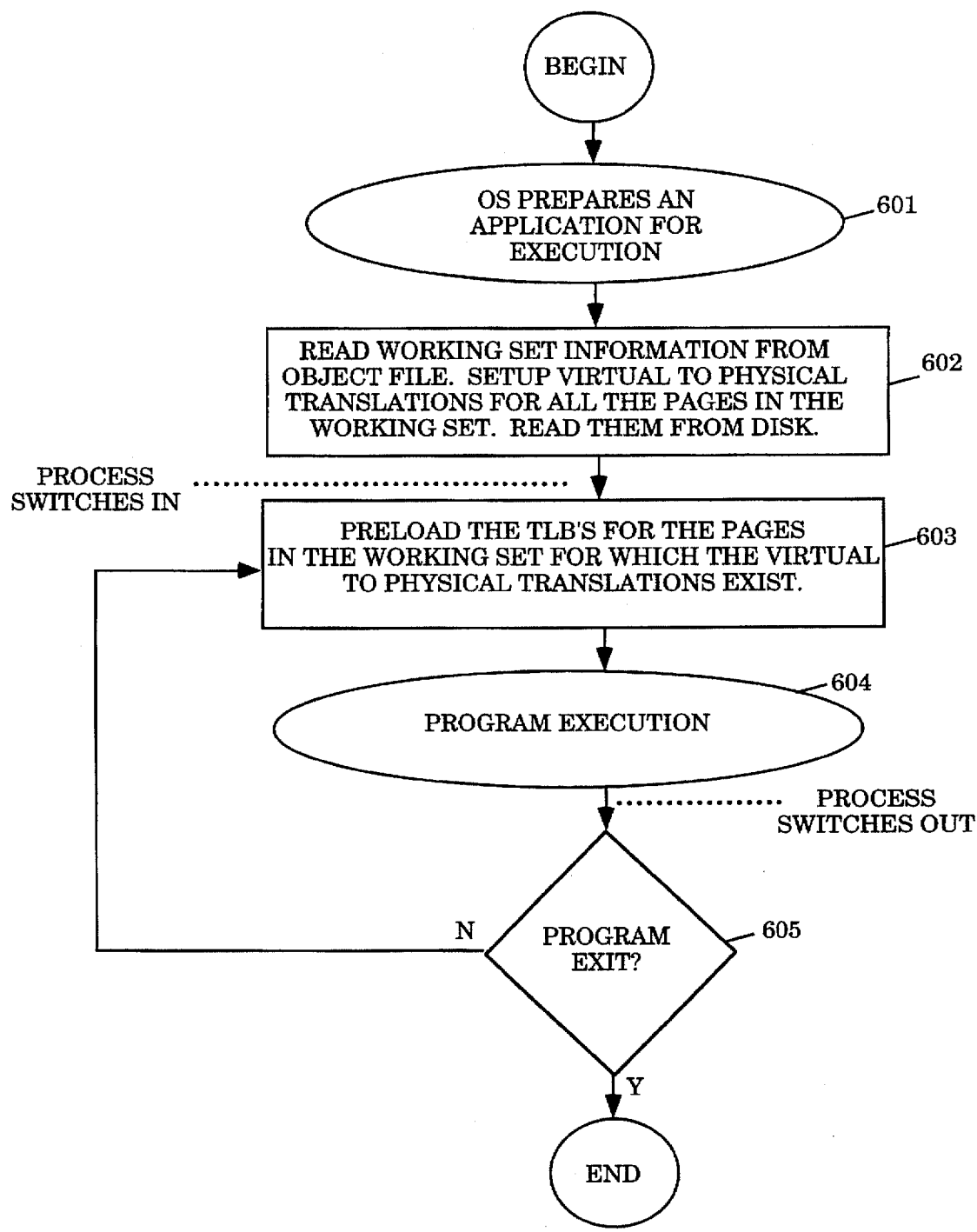
FIG. 6 illustrates the general steps followed by an exemplary implementation of the present invention in applying the working set information to optimize TLB.

FIG. 6 illustrates the general steps followed by the present invention in applying the working set information generated for an application to optimize the TLB. In step 601, the operating system prepares an application for execution. In step 602, the working set information is read from the object file. The virtual to physical translations for all the pages in the working set are set up and read from the disk. Once the process switches in, in step 603, the TLBs for the pages in the working set for which the virtual to physical translations exist are preloaded. In step 604, the program (application) begins execution. Once the process switches out, then it is determined whether or not the switching out indicates a program exit, i.e. that the application has completed its execution. If it does not signify a program exit, then the steps described in steps 603 through 605 are repeated. On the other hand, if the process switching out signifies the program exit, then the process is completed.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for a profile guided translation look-aside buffer (TLB) for reducing the time required to handle TLB miss processing by a processor coupled to a memory comprising the steps of:

collecting information on a plurality of working sets for an application from a corresponding object file in said memory;

determining the frequency with which each of said plurality of working sets is accessed during execution of said application from said information:

assigning pages in said memory to said plurality of working sets according to said determined frequency, the same page being assigned to said plurality of working sets having said frequency substantially equal to said determined frequency, said same page having a size sufficient to store all said plurality of working sets assigned said same page, said plurality of working sets having a virtual address mapping to a physical address corresponding to a single page in said memory; and preloading virtual address to physical address translation entries in said TLB for said pages assigned to said plurality of working sets, said plurality of working sets accessed by an operating system in said memory during execution of said application.

2. The method of claim 1 further comprising the step of setting up virtual to physical address mappings to capture references to pages by said application during execution of said application.

3. The method of claim 2 further comprising the step of determining whether a switching out by said application during program execution indicates a program exit and if there is no program exit, then total number of times pages are referenced by said application is updated, otherwise, if there is a program exit, total number of times said pages are referenced by said application is written into an object file associated with said application.

4. The method of claim 1 wherein said step of preloading is performed before said application begins execution.

5. The method of claim 3 further comprising the step of determining whether said application switching out indicates that said application has completed execution.

6. An apparatus for a profile guided translation look-aside buffer and cache optimization in an operating system comprising:

a working set information for a plurality of working sets for an application stored in a corresponding object file, said plurality of working sets for use by an operating system during execution of said application; and an optimizer coupled to said working set information, said optimizer for, i) collecting said working set information to determine the frequency with which each of said plurality of working sets is accessed during execution of said application;

ii) assigning pages to said plurality of working sets according to said determined frequency, same page being assigned to said plurality of working sets having said frequency substantially equal to said determined frequency, said same page having a size sufficient to store all said plurality of working sets which are assigned said same page, and iii) preloading said TLB for said pages assigned to said plurality of working sets for which virtual to physical address translation exists.

7. The apparatus of claim 6 wherein said optimizer further comprises an evaluator coupled to said working set information for determining said working set of said application.

8. The apparatus of claim 6 wherein said optimizer further comprises a logger coupled to said working set information for logging said working set information into a log corresponding to said application.

9. The apparatus of claim 6 wherein said optimizer determines whether a switching out of a process indicates said application completing execution.

10. A computer system for a profile guided translation look-aside buffer and cache optimization in an operating system comprising:

a storage element for storing, a working set information for a plurality of working sets for an application, said plurality of working sets for use by an operating system during execution of said application, and an optimizer coupled to said working set information, said optimizer for, i) collecting said working set information to determine the frequency with which each of said plurality of working sets is accessed during execution of said application, ii) assigning pages to said plurality of working sets according to said determined frequency, same page being assigned to said plurality of working sets having said frequency substantially equal to said determined frequency, said same page having a size sufficient to store all said plurality of working sets which are assigned said same page, and iii) preloading said TLB for said pages assigned to said plurality of working sets for which virtual to physical address translation exists and a processor coupled to said storage element for driving said optimizer.

11. The system of claim 10 wherein said optimizer further comprises an evaluator coupled to said working set information for determining said working set of said application.

12. The system of claim 10 wherein said optimizer further comprises a logger coupled to said working set information for logging said working set information into a log corresponding to said application.

13. The system of claim 10 wherein said optimizer determines whether a switching out of a process indicates said application completing execution.

14. An apparatus for a profile guided translation look-aside buffer and cache optimization in an operating system comprising:

a working set information for a plurality of working sets for an application, said plurality of working sets for use by an operating system during execution of said application; and means for optimizing coupled to said working set information, said means for optimizing, i) collecting said working set information to determine the frequency with which each of said plurality of working sets is accessed during execution of said application, ii) assigning pages to said plurality of working sets according to said determined frequency, same page being assigned to said plurality of working sets having said frequency substantially equal to said determined frequency, said same page having a size sufficient to store all said plurality of working sets which are assigned said same page, and iii) preloading said TLB for said pages assigned to said plurality of working sets for which virtual to physical address translation exists.

15. The apparatus of claim 14 wherein said means for optimizing further comprises means for evaluating coupled to said working set information for determining said working set of said application.

16. The apparatus of claim 14 wherein said means for optimizing further comprises means for logging coupled to said working set information for logging said working set information into a log corresponding to said application.

17. The apparatus of claim 14 wherein said means for optimizing determines whether a switching out of a process indicates said application completing execution.

18. A computer system for a profile guided translation look-aside buffer and cache optimization in an operating system comprising:

means for storing,
  a working set information for a plurality of working sets for an application, said plurality of working sets for use by an operating system during execution of said application, and
  means for optimizing coupled to said working set information, said means for optimizing,
    i) collecting said working set information to determine the frequency with which each of said plurality of working sets is accessed during execution of said application,
    ii) assigning pages to said plurality of working sets according to said determined frequency, same page being assigned to said plurality of working sets having said frequency substantially equal to said determined frequency, said same page having a size sufficient to store all said plurality of working sets which are assigned said same page, and
    iii) preloading said TLB for said pages assigned to said plurality of working sets for which virtual to physical address translation exists; and means for processing coupled to said storage element for driving said means for optimizing.

19. The system of claim 18 wherein said means for optimizing further comprises means for evaluating coupled to said working set information for determining said working set of said application.

20. The system of claim 18 wherein said means for optimizing further comprises means for logging coupled to said working set information for logging said working set information into a log corresponding to said application.

21. The system of claim 18 wherein said means for optimizing determines whether a switching out of a process indicates said application completing execution.

* * * * *